(12) United States Patent
Tsai et al.

(10) Patent No.: US 9,831,725 B2
(45) Date of Patent: Nov. 28, 2017

(54) WIRELESS COMMUNICATION APPARATUS AND ANTENNA SYSTEM THEREOF

(71) Applicant: ASUSTeK COMPUTER INC., Taipei (TW)

(72) Inventors: Ming-Ting Tsai, Taipei (TW); Hsiang-Jui Hung, Taipei (TW); Yi-Ming Huang, Taipei (TW); Wei-Chen Tu, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 80 days.

(21) Appl. No.: 14/925,976

(22) Filed: Oct. 29, 2015

(65) Prior Publication Data

US 2016/0126777 A1 May 5, 2016

(30) Foreign Application Priority Data

Oct. 30, 2014 (CN) .......................... 2014 1 0599051

(51) Int. Cl.
*H02J 50/27* (2016.01)

(52) U.S. Cl.
CPC .................... *H02J 50/27* (2016.02)

(58) Field of Classification Search
CPC .................. H02J 7/025; H02J 5/005
USPC ........................................................ 320/108
See application file for complete search history.

(56) References Cited

U.S. PATENT DOCUMENTS

| 7,791,311 | B2 | 9/2010 | Sagoo | |
|---|---|---|---|---|
| 2007/0103110 | A1 | 5/2007 | Sagoo | |
| 2012/0001589 | A1 | 1/2012 | Yeh | |
| 2012/0013295 | A1* | 1/2012 | Yeh | H02J 7/025 320/108 |
| 2013/0162201 | A1 | 6/2013 | Yeh | |
| 2014/0015478 | A1* | 1/2014 | Von Novak | H02J 7/0004 320/108 |

FOREIGN PATENT DOCUMENTS

| CN | 1956288 | 5/2007 |
|---|---|---|
| CN | 201797364 | 4/2011 |
| CN | 103259339 | 8/2013 |
| WO | 2013127116 | 9/2013 |

* cited by examiner

*Primary Examiner* — Drew A Dunn
*Assistant Examiner* — Sailesh Thapa
(74) *Attorney, Agent, or Firm* — JCIPRNET

(57) ABSTRACT

A wireless power supply and power receiving device includes a sensor, a control module, a coil module and a rectifying and switching module. The control module determines a position or a direction of the wireless power supply and power receiving device according to the sensor, and the rectifying and switching module selectively operates in a wireless power supply mode or a wireless power receiving mode according to the position or the direction. When in the wireless power supply mode, the rectifying and switching module converts the power energy to wireless power energy to provide power to a first external device by using the coil module. When in the wireless power receiving mode, the rectifying and switching module receives wireless power energy from a second external device via the coil module.

8 Claims, 9 Drawing Sheets

WIRELESS COMMUNICATION APPARATUS AND ANTENNA SYSTEM THEREOF

CROSS-REFERENCE TO RELATED APPLICATION

This application claims the priority benefit of China application serial 201410599051.0, filed on Oct. 30, 2014. The entirety of the above-mentioned patent application is hereby incorporated by reference herein and made a part of specification.

BACKGROUND OF THE INVENTION

Field of the Invention

The disclosure relates to a power transmission device and, particularly, to a wireless power transmission device and operation method thereof.

Description of the Related Art

The internal battery of a portable electronic device is usually charged via a Universal Serial Bus (USB) port. USB connectors have a variety of specifications, such as a mini-USB and a Micro-USB. However, if the plug of the power adapter does not match the socket of the portable electronic device, the portable electronic device cannot be charged. The USB plug is easily damaged after frequently plugging in and out, and the aging of the USB plug and wires is generated after long time used.

BRIEF SUMMARY OF THE INVENTION

The wireless power supply and power receiving device includes a sensor, a control module a coil module and a rectifying and switching module. The control module is coupled to the sensor. The control module generates a determining result according to a position or a direction of the wireless power supply and power receiving device determined by the sensor. The rectifying and switching module is coupled to the coil module and the control module. The rectifying and switching module selectively operates at a wireless power supply mode or a wireless power receiving mode according to the determining result. When the rectifying and switching module operates in the wireless power supply mode, the rectifying and switching module converts the power energy to first wireless power energy to provide power to a first external device by using the coil module. When the rectifying and switching module operates in the wireless power receiving mode, the rectifying and switching module receives second wireless power energy from a second external device by using the coil module.

An operation method of a wireless power supply and power receiving device is disclosed. The operation method of a wireless power supply and power receiving device includes: configuring a sensor, a coil module and a rectifying and switching module in the wireless power supply and power receiving device, wherein the rectifying and switching module is coupled to the coil module; determining a position or a direction of the wireless power supply and power receiving device by using the sensor for generating a determining result; selecting a wireless power supply mode or a wireless power receiving mode according to the determining result; converting power energy to first wireless power energy by using the coil module to provide power to a first external device when the wireless power supply mode is selected; and receiving second wireless power energy from a second external device by using the coil module when the wireless power receiving mode is selected.

As a result, the wireless power supply and power receiving device can selectively operate in the wireless power supply mode or wireless power receiving mode automatically according to sensing/determining a position or a direction of the wireless power supply and power receiving device.

DETAILED DESCRIPTION OF THE EMBODIMENTS

The term "coupled" in the specification represents direct or indirect connection. For example, if a first device is coupled to a second device in this disclosure, it means that the first device is directly connected to the second device, or the first device is indirectly connected to the second device via other device or in other ways. In addition, the same or similar symbols denote same or similar components or steps. Components and steps with same symbols in different embodiments can be with cross-referenced.

Figure 1:
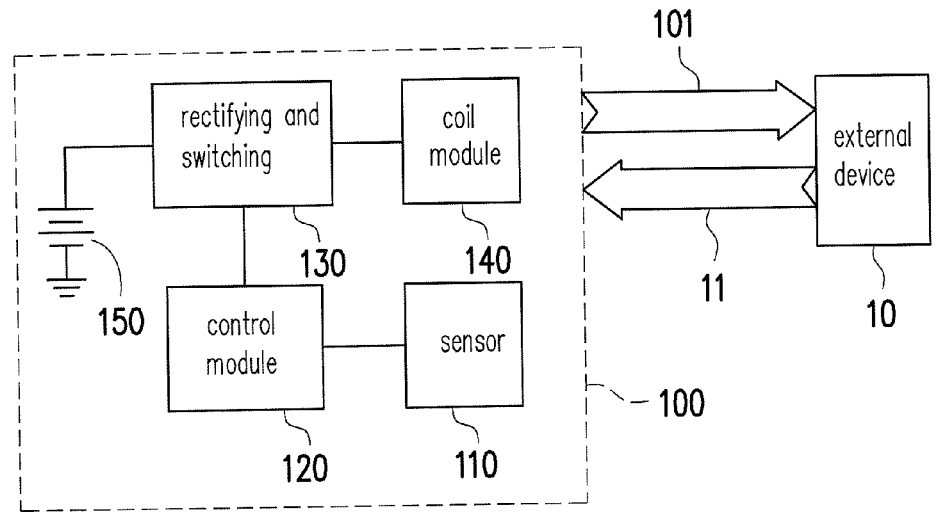
FIG. 1 is a block schematic diagram showing a circuit of a wireless power supply and power receiving device in an embodiment.

FIG. 1 is a block schematic diagram showing a circuit of a wireless power supply and power receiving device 100 in an embodiment. In an embodiment, the wireless power supply and power receiving device 100 is a portable electronic device, such as a mobile phone, a tablet computer, or an audio/video player, which is not limited herein.

The wireless power supply and power receiving device 100 includes a sensor 110, a control module 120, a rectifying and switching module 130, a coil module 140 and a battery module 150. The sensor 110 is an optical sensor, a g-sensor, a ball switch, a gyro sensor, a compass sensor or other physical energy sensors, which is not limited herein.

Figure 2:
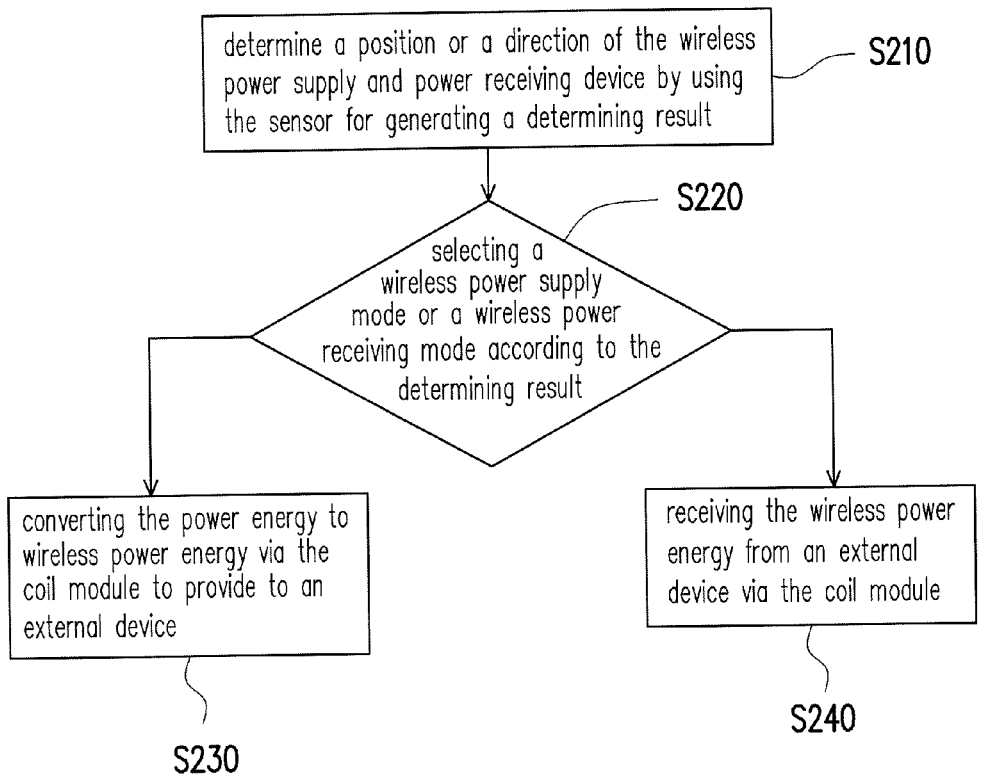
FIG. 2 is a flow chart showing an operation method of the wireless power supply and power receiving device in FIG. 1 in an embodiment.

FIG. 2 is a flow chart showing an operation method of the wireless power supply and power receiving device 100 in FIG. 1 in an embodiment.

The sensor 110 is coupled to the control module 120. In step S210, the sensor 110 determiners a position or a direction of the wireless power supply and power receiving device 100. For example, the control module 120 analyses a sensing signal of the sensor 110 to determine the position or the direction of the wireless power supply and power receiving device 100. In an embodiment, the control module 120 determiners the moving state (or the current position) of the wireless power supply and power receiving device 100 according to the sensing signal of the sensor 110.

The rectifying and switching module 130 is coupled to the control module 120, and the coil module 140 is coupled to the rectifying and switching module 130. The coil module 140 can be placed at the front, the back, the side or other region of the wireless power supply and power receiving device 100. The battery module 150 is coupled to the rectifying and switching module 130. In step S220, the rectifying and switching module 130 selectively operates at a wireless power supply mode or a wireless power receiving mode according to the determining result of the control module 120.

When the wireless power supply mode is selected, the rectifying and switching module 130 operates at the wireless power supply mode. In step S230, the rectifying and switching module 130 converts the power energy provided by the battery module 150 to wireless power energy 101 by using the coil module 140, and then the wireless power energy 101 is provided to an external device 10.

When the wireless power receiving mode is selected, the rectifying and switching module 130 operates at the wireless power receiving mode. In step S240, the rectifying and switching module 130 receives the wireless power energy 11 from the external device 10 by using the coil module 140. The wireless power energy 11 can be supplied to the wireless power supply and power receiving device 100. In an embodiment, the rectifying and switching module 130 converts the wireless power energy 11 provided by the external device 10 to the charging power by using the coil module 140 to charge the battery module 150.

Figure 3:
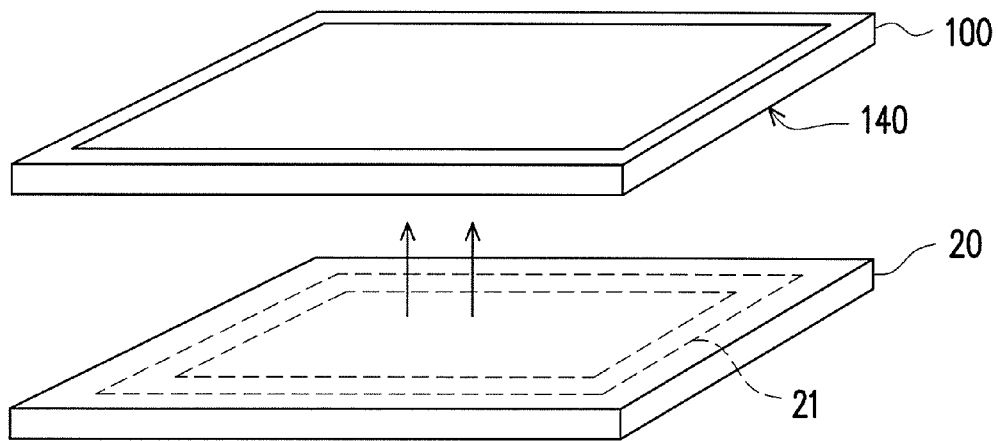
FIG. 3 and FIG. 4 are schematic diagrams showing applications of the wireless power supply and power receiving device in FIG. 1 in an embodiment.
Figure 4:
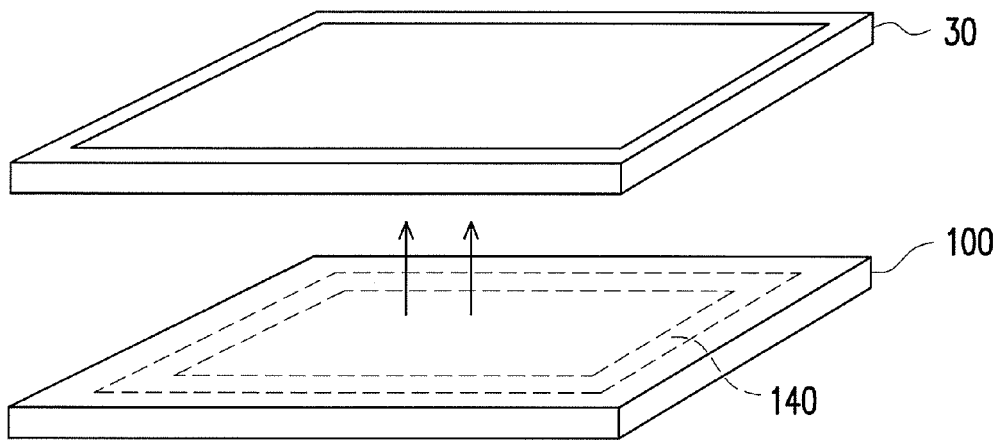

FIG. 3 and FIG. 4 are schematic diagrams showing applications of the wireless power supply and power receiving device 100 in FIG. 1 in an embodiment.

Please refer to FIG. 3, the coil module 140 is placed at the back of the wireless power supply and power receiving device 100 to be used as an inducting surface, and the position of the coil module 140 is no limited herein. An external device 20 is an electronic device with a wireless power supply function, such as a portable power source or a power adaptor, and so on. A coil 21 is configured on the upper surface of the external device 20. The external device 20 can provide wireless power energy to other electric devices (such as the wireless power supply and power receiving device 100) by using the coil 21.

In an embodiment, when the wireless power supply and power receiving device 100 faces upwards (that is, the inducting surface of the coil module 140 faces down) and is placed on the external device 20, the control module 120 selects the wireless power receiving mode automatically. The control module 120 can control the rectifying and switching module 130 to operate at the wireless power receiving mode, and the rectifying and switching module 130 receives wireless power energy from the coil 21 of the external device 20 via the coil module 140, and the wireless power energy is converted to the charging power to charge the battery module 150.

Please refer to FIG. 4, when the wireless power supply and power receiving device 100 faces down (that is, the inducting surface of the coil module 140 faces upwards), the control module 120 selects the wireless power supply mode automatically. The control module 120 controls the rectifying and switching module 130 to operate at the wireless power supply mode. The rectifying and switching module 130 can convert the power energy provided by the battery module 150 to the wireless power energy by using the coil module 140, the wireless power energy can be provided to other electric device (such as an external device 30).

By sensing/determining the position or the direction of the wireless power supply and power receiving device 100 via the sensor 110 and the control module 120, the wireless power supply and power receiving device 100 is selectively operated in the wireless power supply mode or the wireless power receiving mode.

Figure 5:
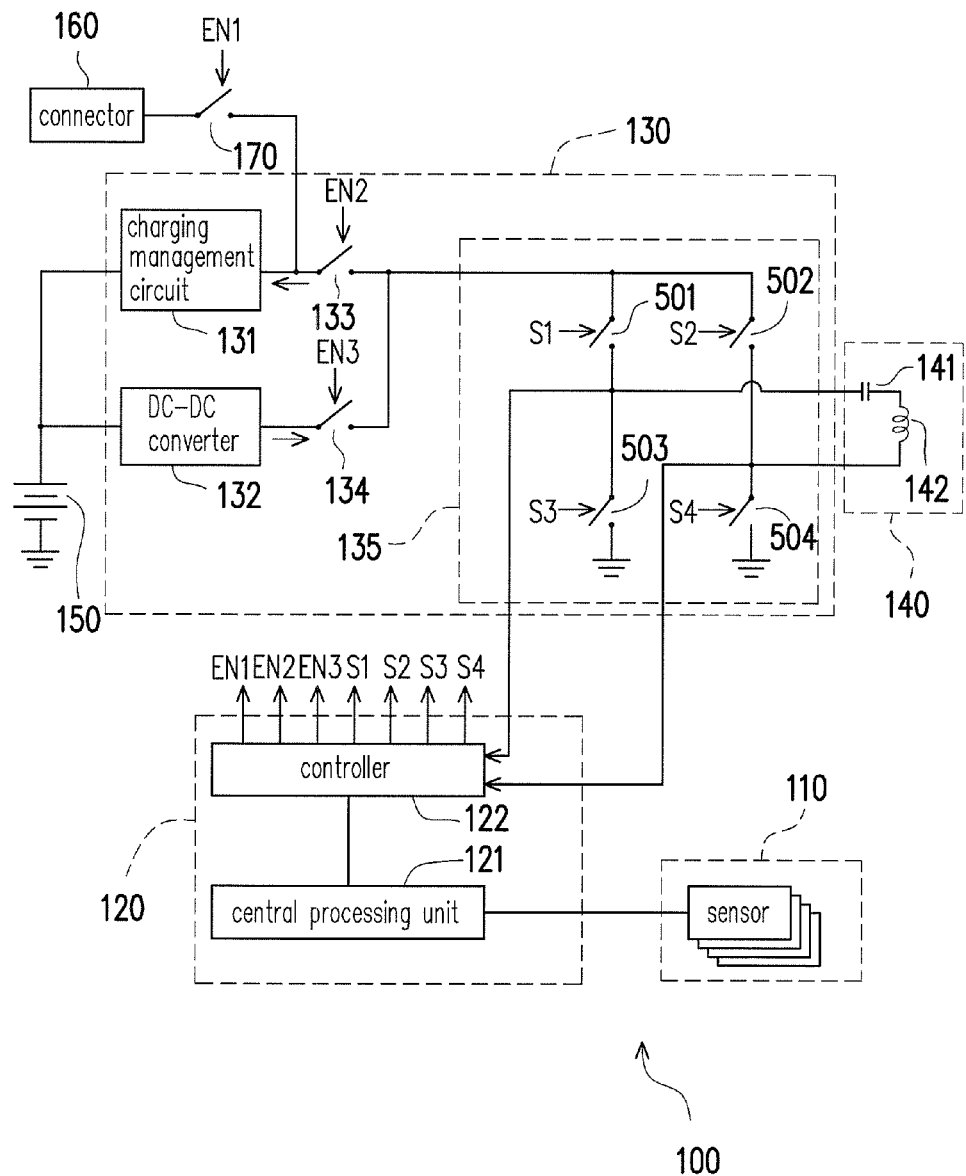
FIG. 5 is a circuit diagram of a wireless power supply and power receiving device in FIG. 1 in an embodiment.

FIG. 5 is a circuit diagram showing a wireless power supply and power receiving device 100 in FIG. 1 in an embodiment. The control module 120 includes a central processing unit 121 and a controller 122. The central processing unit 121 is coupled to the sensor 110 to receive the sensing signal. According to the sensing signal of the sensor 110, the central processing unit 121 determines the position or the direction of the wireless power supply and power receiving device 100 to get a determining result.

The controller 122 may be a microcontroller, a microprocessor, a digital signal processor or other control circuits, which is not limited herein. The controller 122 is coupled to the central processing unit 121 and the rectifying and switching module 130. The controller 122 changes and outputs at least a control signal (such as the signal of EN1, EN2, EN3, S1, S2, S3 or S4 shown in FIG. 5) to the rectifying and switching module 130 according to the determining result of the central processing unit 121. The rectifying and switching module 130 is selectively operated at the wireless power supply mode or the wireless power receiving mode according to the control signal.

In FIG. 5, the rectifying and switching module 130 includes a charging management circuit 131, a DC-DC converter 132, a switch 133, a switch 134 and a rectifying and switching circuit 135. An output end of the charging management circuit 131 is coupled to the battery module 150. An input end of the charging management circuit 131 receives charging power to charge the battery module 150. An input end of the DC-DC converter 132 is coupled to the battery module 150. The DC-DC converter 132 may be a buck converter, a boost converter, a buck-boost converter or other DC-DC converters, which is not limited herein.

A first end of the switch 133 is coupled to the input end of the charging management circuit 131. A first end of the switch 134 is coupled to an output end of the DC-DC converter 132. A first end of the rectifying and switching circuit 135 is coupled to a second end of the switch 133 and a second end of the switch 134. A second end of the rectifying and switching circuit 135 is coupled to the coil module 140. The switch 133 and the switch 134 are controlled by the control signal EN2 and EN3 of the controller 122, respectively. In a coil disable mode, the switch 133 and the switch 134 are turned off (OFF), thus, the wireless power receiving function (receiver) and the wireless power supply function (transmitter) of the wireless power supply and power receiving device 100 are disabled.

In the wireless power supply mode, the switch 133 is turned off, and the switch 134 is turned on. Thus, the rectifying and switching circuit 135 can receive power provided by the battery module 150 via the DC-DC converter 132 and the switch 134. In the wireless power supply mode, the rectifying and switching circuit 135 converts the power provided by the battery module 150 to the wireless power energy via the coil module 140.

In the wireless power receiving mode, the switch 133 is turned on, and the switch 134 is turned off. The rectifying and switching circuit 135 converts the received wireless power energy to the charging power via the coil module 140. The charging power is supplied to the charging management circuit 131 via the switch 133. Thus, the charging management circuit 131 can charge the battery module 150 in the wireless power receiving mode.

In an embodiment, in the wireless power supply mode, the charging management circuit 131 is disabled, and the DC-DC converter 132 is enabled. In the wireless power receiving mode, the charging management circuit 131 is enabled, and the DC-DC converter 132 is disabled. The power consumption can be saved by disabling the charging management circuit 131 or the DC-DC converter 132.

In FIG. 5, the rectifying and switching circuit 135 includes a switch 501, a switch 502, a switch 503 and a switch 504. A first end of the switch 501 is coupled to the second end of the switch 133 and the second end of the switch 134. A second end of the switch 501 is coupled to a first end of the coil module 140. A first end of the switch 502 is coupled to the second end of the switch 133 and the second end of the switch 134. A second end of the switch 502 is coupled to a second end of the coil module 140. A first end of the switch 503 is coupled to the second end of the switch 501. A second end of the switch 503 is coupled to a reference voltage (such as the grounding voltage or other constant voltage). A first end of the switch 504 is coupled to the second end of the switch 502. A second end of the switch 504 is coupled to the reference voltage (such as the grounding voltage or other constant voltage). The switch 501, the switch 502, the switch 503 and the switch 504 are controlled by the control signals S1, S2, S3 and S4 of the controller 122, respectively.

Figure 6:
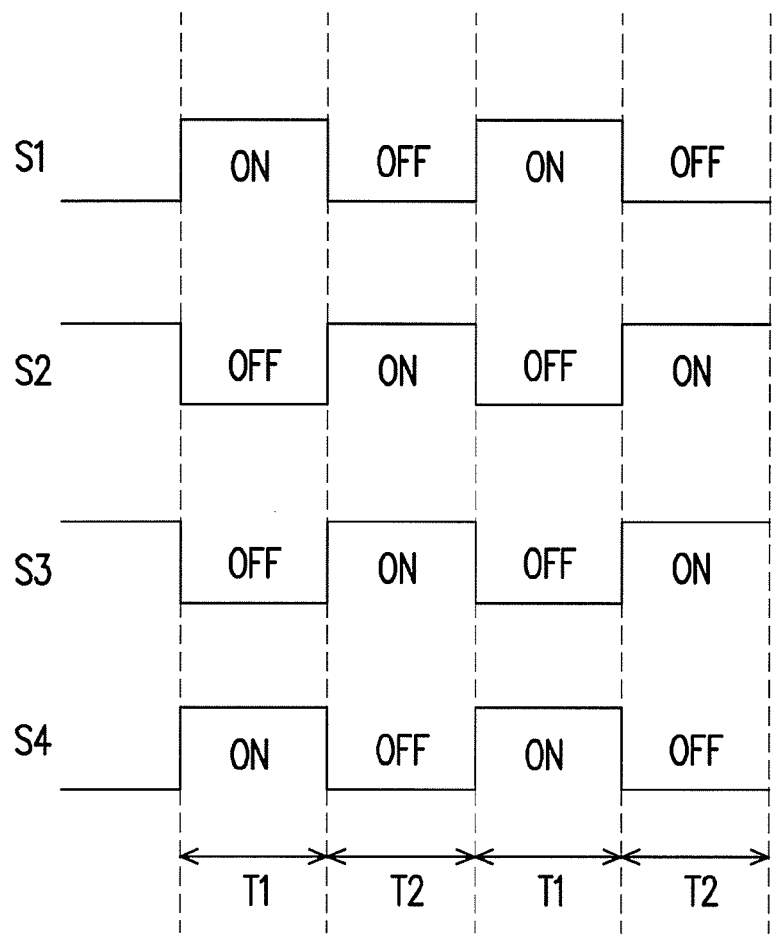
FIG. 6 is a schematic diagram showing the timing sequence of control signals S1, S2, S3 and S4 in FIG. 5 when the wireless power supply and power receiving device is operated at a wireless power supply mode in an embodiment.

FIG. 6 is a schematic diagram showing the timing sequence of control signals S1, S2, S3 and S4 when the wireless power supply and power receiving device is operated at a wireless power supply mode in an embodiment. In the wireless power supply mode, in a period T1, the switch 501 and the switch 504 are turned on, and the switch 502 and the switch 503 are turned off. In a period T2, the switch 501 and the switch 504 are turned off, and the switch 502 and the switch 503 are turned on.

Consequently, in the wireless power supply mode, the rectifying and switching circuit 135 can convert direct current provided by the DC-DC converter 132 to alternating current, and the alternating current is supplied to the coil module 140. In an embodiment, the DC-DC converter 132 can be omitted according to requirements to make the first end of the switch 134 directly connected to the battery module 150.

However, the operation of the switches 501 to 504 in the wireless power supply mode is not limited to that in the embodiments. For example, in an embodiment, in the wireless power supply mode, the controller 122 controls the switch 502 to be turned off and controls the switch 504 to be turned on. In the wireless power supply mode, in the period T1, the switch 501 is turned on, and the switch 503 is turned off. In the period T2, the switch 501 is turned off, and the switch 503 is turned on. Thus, in the wireless power supply mode, the rectifying and switching circuit 135 can convert direct current provided by the DC-DC converter 132 to alternating current, and the alternating current is supplied to the coil module 140.

In FIG. 5, in the wireless power receiving mode, the controller 122 compares the voltage of the first end of the coil module 140 and that of the second end of the coil module 140. If the voltage of the first end is higher than the voltage of the second end, the switch 501 and the switch 504 are turned on, and the switch 502 and the switch 503 are turned off. If the voltage of the first end of the coil module 140 is lower than the voltage of the second end of the coil module 140, the switch 501 and the switch 504 are turned off, and the switch 502 and the switch 503 are turned on.

Consequently, in the wireless power receiving mode, the rectifying and switching circuit 135 can rectify the alternating current of the coil module 140 to direct current, and the rectified direct current is supplied to the charging management circuit 131 via the switch 133. In an embodiment, the charging management circuit 131 can be omitted according to requirements to make the first end of the switch 133 directly connected to the battery module 150.

However, the operations of the switches 501 to 504 in the wireless power receiving mode are not limited to these in the embodiments. In an embodiment, in the wireless power receiving mode, the controller 122 controls the switch 502 to be turned off and controls the switch 504 to be turned on.

In wireless power receiving mode, the controller 122 compares the voltage of the first end of the coil module 140 and that of the second end of the coil module 140. When the voltage of the first end of the coil module 140 is higher than the voltage of the second end of the coil module 140, the switch 501 is turned on, and the switch 503 is turned off. When the voltage of the first end of the coil module 140 is lower than the voltage of the second end of the coil module 140, the switch 501 and the switch 503 are turned off. Consequently, in the wireless power receiving mode, the rectifying and switching circuit 135 can rectify the alternating current of the coil module 140 to direct current, and the rectified direct current is supplied to the charging management circuit 131 via the switch 133.

In the embodiment shown in FIG. 5, the coil module 140 includes a resonant capacitor 141 and a coil 142. A first end of the resonant capacitor 141 is coupled to the second end of the switch 501. A first end of the coil 142 is coupled to a second end of the resonant capacitor 141. A second end of the coil 142 is coupled to the second end of the switch 502. In an embodiment, the resonant capacitor 141 can be omitted according to requirements to make the first end of the coil 142 directly connected to the rectifying and switching circuit 135.

Please refer to FIG. 5, the wireless power supply and power receiving device 100 further includes a connector 160 and a switch 170. The connector 160 can be any type of power supply connector (such as a USB connector), and the connector 160 is used to be connected to an external power supply (not shown in FIG. 5, such as a power converter, a portable power source or a computer) to receive the supply voltage to charge the battery module 150.

In the wireless power supply mode, the switch 170 is turned on. Thus, the charging management circuit 131 can receive the power provided by an external power supply (not shown) to charge the battery module 150 via the connector 160. In the wireless power receiving mode, the switch 170 is turned off.

Figure 7:
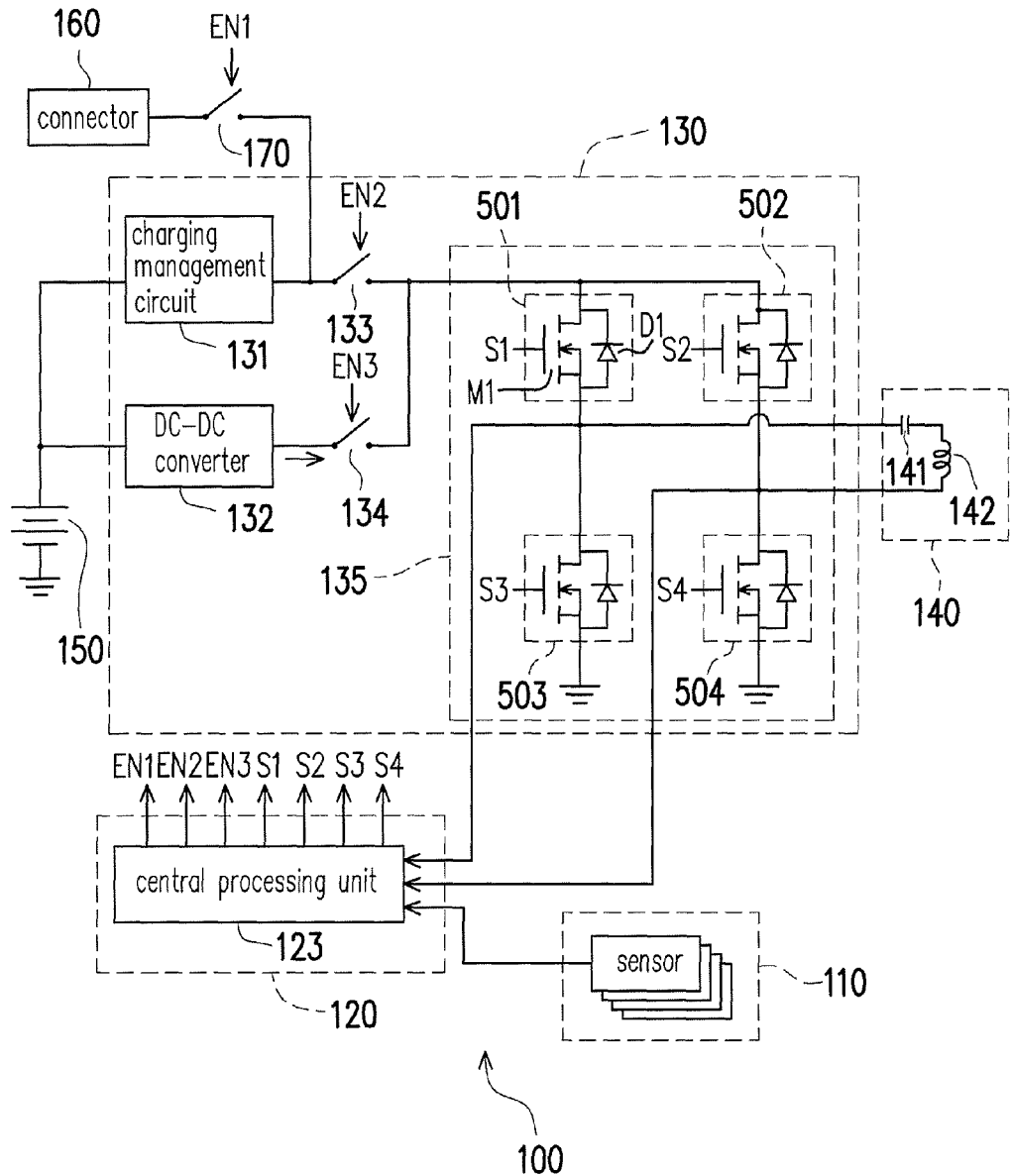
FIG. 7 is a circuit diagram of a wireless power supply and power receiving device in FIG. 1 in an embodiment.

FIG. 7 is a circuit diagram showing a wireless power supply and power receiving device 100 in an embodiment. Similar description can refer to that of FIG. 5. In FIG. 7, the control module 120 includes an application processor 123. The application processor 123 is coupled to the sensor 110 to receive a sensing signal, and the position or the direction of the wireless power supply and power receiving device 100 is determined according to the sensing signal to get a determining result.

The application processor 123 changes and outputs at least a control signal (such as signals EN1, EN2, EN3, S1, S2, S3 and S4 shown in FIG. 7) to the rectifying and switching module 130 according to the determining result. The rectifying and switching module 130 is selectively operated at the wireless power supply mode or the wireless power receiving mode according to the control signal. The details of the application processor 123 in FIG. 7 can be analogized with reference to the description of the central processing unit 121 and the controller 122 in FIG. 5. In an embodiment, the application processor 123 runs an operating system (OS).

Please refer to FIG. 7, each of the switch 501, the switch 502, the switch 503 and the switch 504 includes a transistor and a diode. The switch 502, the switch 503 and the switch 504 can be analogized with reference to the description of the switch 501. The switch 501 includes an N-channel metal-oxide-semiconductor field effect transistor (NMOS-FET) M1 and a diode D1. The drain of the transistor M1 and the cathode of the diode D1 are coupled to the second end of the switch 133 and the second end of the switch 134. The source of the transistor M1 and the anode of the diode D1 are coupled to the first end of the coil module 140. The gate of the transistor M1 is coupled to the control module 120 to receive the control signal S1.

Figure 8:
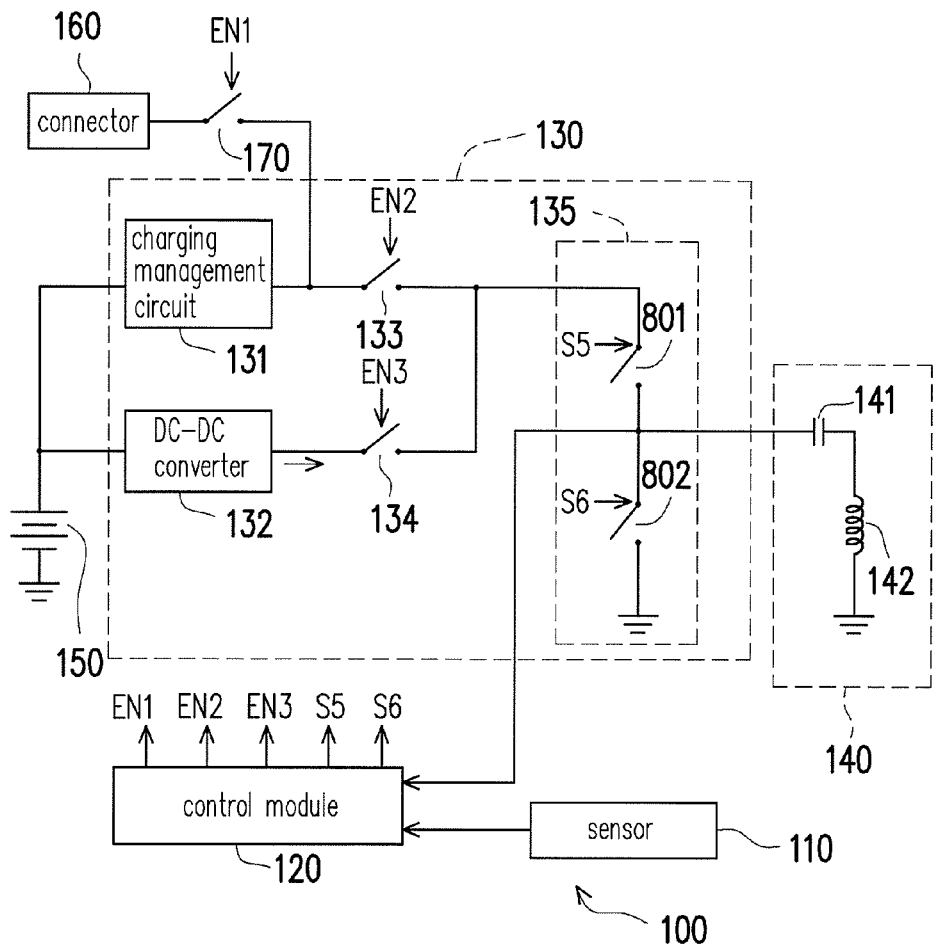
FIG. 8 is a circuit diagram of a wireless power supply and power receiving device in FIG. 1 in an embodiment.

FIG. 8 is a circuit diagram showing a wireless power supply and power receiving device 100 in an embodiment. The embodiment shown in FIG. 8 can be analogized with reference to the description of FIG. 5 and FIG. 7. In FIG. 8, the rectifying and switching circuit 135 includes a switch 801 and a switch 802. A first end of the switch 801 is coupled to the second end of the switch 133 and the second end of the switch 134. A second end of the switch 801 is coupled to the first end of the coil module 140. A first end of the switch 802 is coupled to the second end of the switch 801. A second end of the switch 802 is coupled to a reference voltage (such as the grounding voltage or another constant voltage). The switch 801 and the switch 802 are controlled by the control signals S5 and S6 of the control module 120, respectively.

Figure 9:
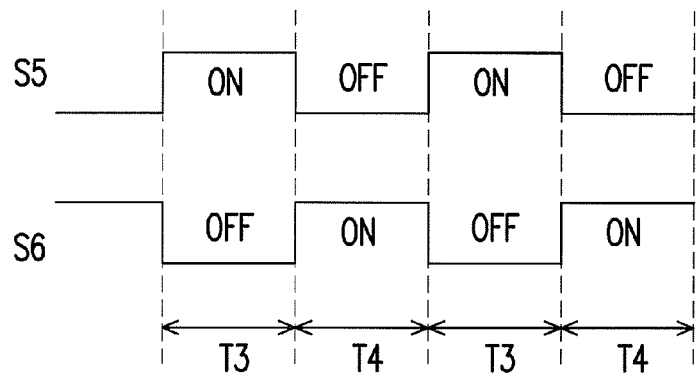
FIG. 9 is a schematic diagram showing the timing sequence of control signal S5 and S6 in FIG. 8 when the wireless power supply and power receiving device is operated at wireless power supply mode.

FIG. 9 is a schematic diagram showing the timing sequence of control signals S5 and S6 when the wireless power supply and power receiving device 100 is operated at the wireless power supply mode. In the wireless power supply mode, the switch 133 is turned off and the switch 134 is turned on. In the wireless power supply mode, in a period T3, the switch 801 is turned on, and the switch 802 is turned off. In a period T4, the switch 801 is turned off, and the switch 802 is turned on. Consequently, in the wireless power supply mode, the rectifying and switching circuit 135 can convert direct current provided by the DC-DC converter 132 to alternating current, and the alternating current is supplied to the coil module 140. In an embodiment, the DC-DC converter 132 can be omitted according to requirements to make the first end of the switch 134 directly connected to the battery module 150.

Please refer to FIG. 8, in the wireless power receiving mode, the switch 133 is turned on, the switch 134 is turned off. In the wireless power receiving mode, the control module 120 can receive and detect the voltage of the first end of the coil module 140. If the voltage of the first end of the coil module 140 is higher than the reference voltage (such as the grounding voltage or other constant voltage), the control module 120 controls the switch 801 to be turned on and controls the switch 802 to be turned off. If the voltage of the first end of the coil module 140 is not higher than the reference voltage (such as the grounding voltage or other constant voltage), the control module 120 controls the switch 801 and the switch 802 to be turned off. Consequently, in the wireless power receiving mode, the rectifying and switching circuit 135 can rectify the alternating current of the coil module 140 to direct current, and the rectified direct current is supplied to the charging management circuit 131 via the switch 133.

In the embodiment shown in FIG. 8, the coil module 140 includes a resonant capacitor 141 and a coil 142. A first end of the resonant capacitor 141 is coupled to the second end of the switch 801. A first end of the coil 142 is coupled to a second end of the resonant capacitor 141. A second end of the coil 142 is coupled to the reference voltage (such as the grounding voltage or another constant voltage). In an embodiment, the resonant capacitor 141 can be omitted according to requirements to make the first end of the coil 142 directly connected to the rectifying and switching circuit 135.

Figure 10:
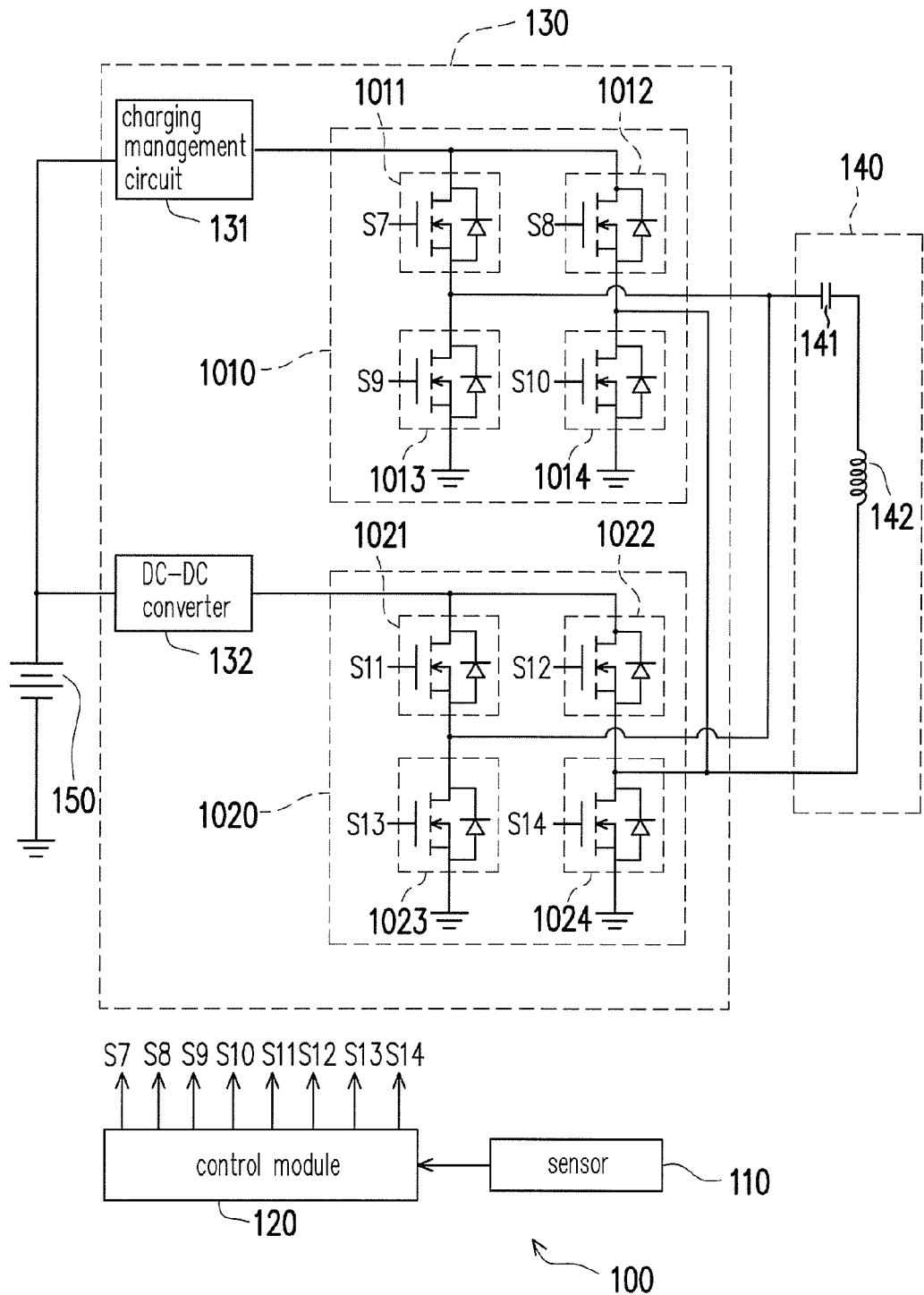
FIG. 10 is a circuit diagram of a wireless power supply and power receiving device in FIG. 1 in a an embodiment.

FIG. 10 is a circuit diagram showing a wireless power supply and power receiving device 100 in an embodiment, which can be analogized with reference to the description of FIG. 5, FIG. 7 and FIG. 8. In the embodiment shown in FIG. 10, the rectifying and switching module 130 includes a charging management circuit 131, a DC-DC converter 132, a rectifying circuit 1010 and a switch circuit 1020.

The output end of the rectifying circuit 1010 is coupled to the battery module 150 via the charging management circuit 131. The input end of the rectifying circuit 1010 is coupled to the coil module 140. In the wireless power supply mode, the rectifying circuit 1010 is disabled under the control of a control module 120. In the wireless power receiving mode, the rectifying circuit 1010 converts the wireless power energy received by the coil module 140 to the charging power, and the charging power is supplied to the battery module 150 via the charging management circuit 131.

The input end of the switch circuit 1020 is coupled to the battery module via the DC-DC converter 132. The output end of the switch circuit 1020 is coupled to the coil module 140. In the wireless power receiving mode, the switch circuit 1020 is disabled under the control of a control module 120. In the wireless power supply mode, the switch circuit 1020 converts power energy (direct current) provided by the battery module 150 to alternating current via the DC-DC converter 132, and the alternating current is converted to wireless power energy via the coil module 140.

In the embodiment shown in FIG. 10, the switch circuit 1020 includes a switch 1021, a switch 1022, a switch 1023 and a switch 1024. The switches 1021 to 1024 can be analogized with reference to the description of the switches 501 to 504 in FIG. 7. A first end of the switch 1021 is coupled to the battery module 150 via the DC-DC converter 132. A second end of the switch 1021 is coupled to the first end of the coil module 140. A first end of the switch 1022 is coupled to the battery module 150 via the DC-DC converter 132. A second end of the switch 1022 is coupled to the second end of the coil module 140. A first end of the switch 1023 is coupled to the second end of the switch 1021. A second end of the switch 1023 is coupled to a reference voltage (such as the grounding voltage or another constant voltage). The first end of the switch 1024 is coupled to the second end of the switch 1022. The second end of the switch 1024 is coupled to the reference voltage (such as the grounding voltage or other constant voltage). The switches 1021 to 1024 are controlled by the control signals S11, S12, S13 and S14 of the control module 120, respectively. The control signals S11, S12, S13 and S14 in FIG. 10 can be analogized with reference to the description of the control signals S1 to S4 in FIG. 5 and FIG. 6.

In the wireless power supply mode, in a first period, the switch 1021 and the switch 1024 are turned on, the switch 1022 and the switch 1023 are turned off. In a second period, the switch 1021 and the switch 1024 are turned off, and the switch 1022 and the switch 1023 are turned on. Consequently, in the wireless power supply mode, the switch circuit 1020 can convert direct current provided by the DC-DC converter 132 to alternating current, and the alternating current is supplied to the coil module 140. In an embodiment, the DC-DC converter 132 can be omitted according to requirements to make the first end of the switch 1021 and the first end of the switch 1022 directly connected to the battery module 150. In the wireless power receiving mode, the switches 1021 to 1024 are turned off.

In the embodiment shown in FIG. 10, the rectifying circuit 1010 includes a switch 1011, a switch 1012, a switch 1013 and a switch 1014. The switches 1011 to 1014 can be analogized with reference to the description of the switch 501 in FIG. 7. A first end of the switch 1011 is coupled to the battery module 150 via the charging management circuit 131. A second end of the switch 1011 is coupled to the first end of the coil module 140. A first end of the switch 1012 is coupled to the battery module 150 via the charging management circuit 131. A second end of the switch 1012 is coupled to the second end of the coil module 140. A first end of the switch 1013 is coupled to the second end of the switch 1011. A second end of the switch 1013 is coupled to the reference voltage (such as the grounding voltage or another constant voltage). A first end of the switch 1014 is coupled to the second end of the switch 1012. A second end of the switch 1014 is coupled to the reference voltage (such as the grounding voltage or another constant voltage). The switches 1011 to 1014 are controlled by the control signals S7, S8, S9 and S10 of the control module 120, respectively. The control signals S7, S8, S9 and S10 in FIG. 10 can be analogized with reference to the description of the control signals S1 to S4 in FIG. 5.

When in the wireless power supply mode, the switch 1011, the switch 1012, the switch 1013 and the switch 1014 are turned off. When in wireless power receiving mode, the control module 120 receives and compare the voltage of the first end of the coil module 140 and the voltage of the second end of the coil module 140. If the voltage of the first end of the coil module 140 is higher than the voltage of the second end of the coil module 140, the switch 1011 and the switch 1014 are turned on, and the switch 1012 and the switch 1013 are turned off. If the voltage of the first end of the coil module 140 is lower than the voltage of the second end of the coil module 140, the switch 1011 and the switch 1014 are turned off, and the switch 1012 and the switch 1013 are turned on. Consequently, in the wireless power receiving mode, the rectifying circuit 1010 can rectify the alternating current of the coil module 140 to direct current, and the rectified direct current is supplied to the charging management circuit 131 via the switch 133. In an embodiment, the charging management circuit 131 can be omitted according to requirements to make the first end of the switch 1011 and the first end of the switch 1012 directly connected to the battery module 150.

Figure 11:
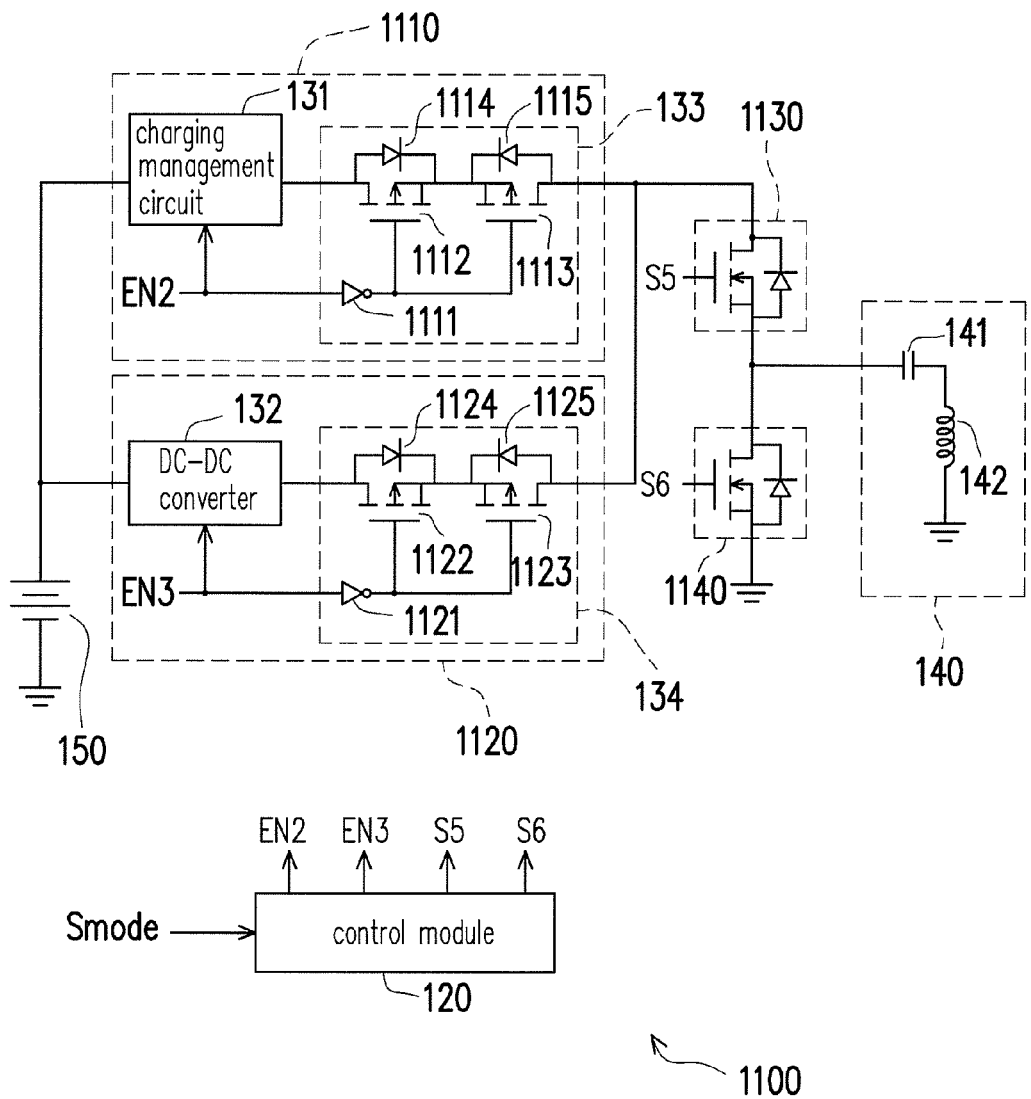
FIG. 11 is a block schematic diagram showing a circuit of a wireless power supply and power receiving device in an embodiment.

FIG. 11 is a block schematic diagram showing a circuit of a wireless power supply and power receiving device 1100 in an embodiment. The embodiment shown in FIG. 11 can be analogized with reference to the description of FIG. 1 to FIG. 10. The wireless power supply and power receiving device 1100 shown in FIG. 11 includes a battery module 150, a charge management module 1110, a DC-DC convert module 1120, a switch 1130, a switch 1140 and a coil module 140. The output end of the charge management module 1110 is coupled to the battery module 150. The input end of the DC-DC convert module 1120 is coupled to the battery module 150.

A first end of the switch 1130 is coupled to the input end of the charge management module 1110 and the output end of the DC-DC convert module 1120. A first end of the switch 1140 is coupled to a second end of the switch 1130. A second end of the switch 1140 is coupled to a reference voltage (such as the grounding voltage or other constant voltage). The operation method of the switch 1130 and the switch 1140 in FIG. 11 can be analogized with reference to the description of the switch 801 and the switch 802 in FIG. 8. The details of the switch 1130 and the switch 1140 in FIG. 11 can be analogized with reference to the description of the switch 501 in FIG. 7.

A first end of the coil module 140 is coupled to the second end of the switch 1130. A second end of the coil module 140 is coupled to the reference voltage (such as the grounding voltage or another constant voltage). The coil module 140 in FIG. 11 can be analogized with reference to the description of the coil module 140 in FIG. 8.

The control module 120 shown in FIG. 11 is coupled to the enable end of the charge management module 1110 to provide the control signal EN2. The control module 120 is coupled to the enable end of the DC-DC convert module 1120 to provide the control signal EN3. The control module 120 is coupled to the control end of the switch 1130 to provide a control signal S5. The control module 120 is coupled to the control end of the switch 1140 to provide a control signal S6.

The control module 120 in FIG. 11 can select an operation mode according to a mode signal Smode. For example, the control module 120 can selectively operate at a wireless power supply mode, a wireless power receiving mode or a coil disable mode according to the mode signal Smode. In the coil disable mode, under the control of the control module 120, the charge management module 1110 and the DC-DC convert module 1120 are disabled, and the switch 1130 and the switch 1140 are turned off. According to different requirements, the mode signal Smode can be generated by an operation instruction from the user interface (not shown), a sensing signal from the sensor (not shown, such as the sensor 110 in FIG. 1), or other control signals, which is not limited herein.

Please refer to FIG. 9 and FIG. 11, when the wireless power supply and power receiving device 1100 is operated in the wireless power supply mode, according to the control of the control module 120, in the period T3, the switch 1130 is turned on and the switch 1140 is turned off, in the period T4, the switch 1130 is turned off and the switch 1140 is turned on. In the period T3 and the period T4, the charge management module 1110 is disabled, and the DC-DC convert module 1120 is enabled. Consequently, in the wireless power supply mode, the switch 1130 the switch 1140 can convert direct current provided the DC-DC convert module 1120 to alternating current, and the alternating current is supplied to the coil module 140.

In FIG. 11, when the wireless power supply and power receiving device 1100 is operated in the wireless power receiving mode, the charge management module 1110 is enabled, and the DC-DC convert module 1120 is disabled. When the wireless power supply and power receiving device 1100 is operated in the wireless power receiving mode, the control module 120 can receive and detect the voltage of the first end of the coil module 140. If the voltage of the first end of the coil module 140 is higher than the reference voltage (such as the grounding voltage or another constant voltage), the control module 120 controls the switch 1130 to be turned on and controls the switch 1140 to be turned off. If the voltage of the first end of the coil module 140 is not higher than the reference voltage (such as the grounding voltage or another constant voltage), the control module 120 controls the switch 1130 and the switch 1140 to be turned off. Consequently, in the wireless power receiving mode, the switch 1130 and the switch 1140 can rectify the alternating current of the coil module 140 to direct current, and the rectified direct current is supplied to the battery module 150 via the charge management module 1110.

In the embodiment shown in FIG. 11, the charge management module 1110 includes a charging management circuit 131 and a switch 133. The output end of the charging management circuit 131 is coupled to the battery module 150. A first end of the switch 133 is coupled to the input end of the charging management circuit 131. A second end of the switch 133 is coupled to the first end of the switch 1130. When the wireless power supply and power receiving device 1100 is operated in the wireless power supply mode, according to the control signal EN2 of the control module 120, the switch 133 is turned off, and the charging management circuit 131 is disabled. When the wireless power supply and power receiving device 1100 is operated in the wireless power receiving mode, according to the control signal EN2 of the control module 120, the switch 133 is turned on, and the charging management circuit 131 is enabled.

In the embodiment shown in FIG. 11, the switch 133 includes a NOT gate 1111, a transistor 1112, a transistor 1113, a diode 1114 and a diode 1115. The transistor 1112 and the transistor 1113 are P-channel metal-oxide-semiconductor field effect transistors (PMOSFET). The input end of the NOT gate 1111 is the control end of the switch 133. The output end of the NOT gate 1111 is coupled to the gate of the transistor 1112 and the gate of the transistor 1113. The drain of the transistor 1112 used as the first end of the switch 133 is coupled to the input end of the charging management circuit 131. The source of the transistor 1112 is coupled to the source of the transistor 1113. The drain of the transistor 1113 used as the second end of the switch 133 is coupled to the first end of the switch 1130. The anode of the diode 1114 is coupled to the drain of the transistor 1112. The cathode of the diode 1114 is coupled to the source of the transistor 1112. The cathode of the diode 1115 is coupled to the source of the transistor 1113. The anode of the diode 1115 is coupled to the drain of the transistor 1113.

In the embodiment shown in FIG. 11, the DC-DC convert module 1120 includes a DC-DC converter 132 and a switch 134. The input end of the DC-DC converter 132 is coupled to the battery module 150. A first end of the switch 134 is coupled to the output end of the DC-DC converter 132. A second end of the switch 134 is coupled to the first end of the switch 1130. When the wireless power supply and power receiving device 1100 is operated in the wireless power supply mode, according to the control signal EN3 of the control module 120, the switch 134 is turned on, and the DC-DC converter 132 is enabled. When the wireless power supply and power receiving device 1100 is operated in the wireless power receiving mode, according to the control signal EN3 of the control module 120, the switch 134 is turned off, and the DC-DC converter 132 is disabled.

In the embodiment shown in FIG. 11, the switch 134 includes a NOT gate 1121, a transistor 1122, a transistor 1123, a diode 1124 and a diode 1125. The transistor 1122 and the transistor 1123 are P-channel metal-oxide-semiconductor field effect transistor (PMOSFET). The input end of the NOT gate 1121 is the control end of the switch 134. The output end of the NOT gate 1121 is coupled to the gate of the transistor 1122 and the gate of the transistor 1123. The drain of the transistor 1122 used as the first end of the switch 134 is coupled to the output end of the DC-DC converter 132. The source of the transistor 1122 is coupled to the source of the transistor 1123. The drain of the transistor 1123 used as the second end of the switch 134 is coupled to the first end of the switch 1130. The anode of the diode 1124 is coupled to the drain of the transistor 1122. The cathode of the diode 1124 is coupled to the source of the transistor 1122. The cathode of the diode 1125 is coupled to the source of the transistor 1123. The anode of the diode 1125 is coupled to the drain of the transistor 1123.

Figure 12:
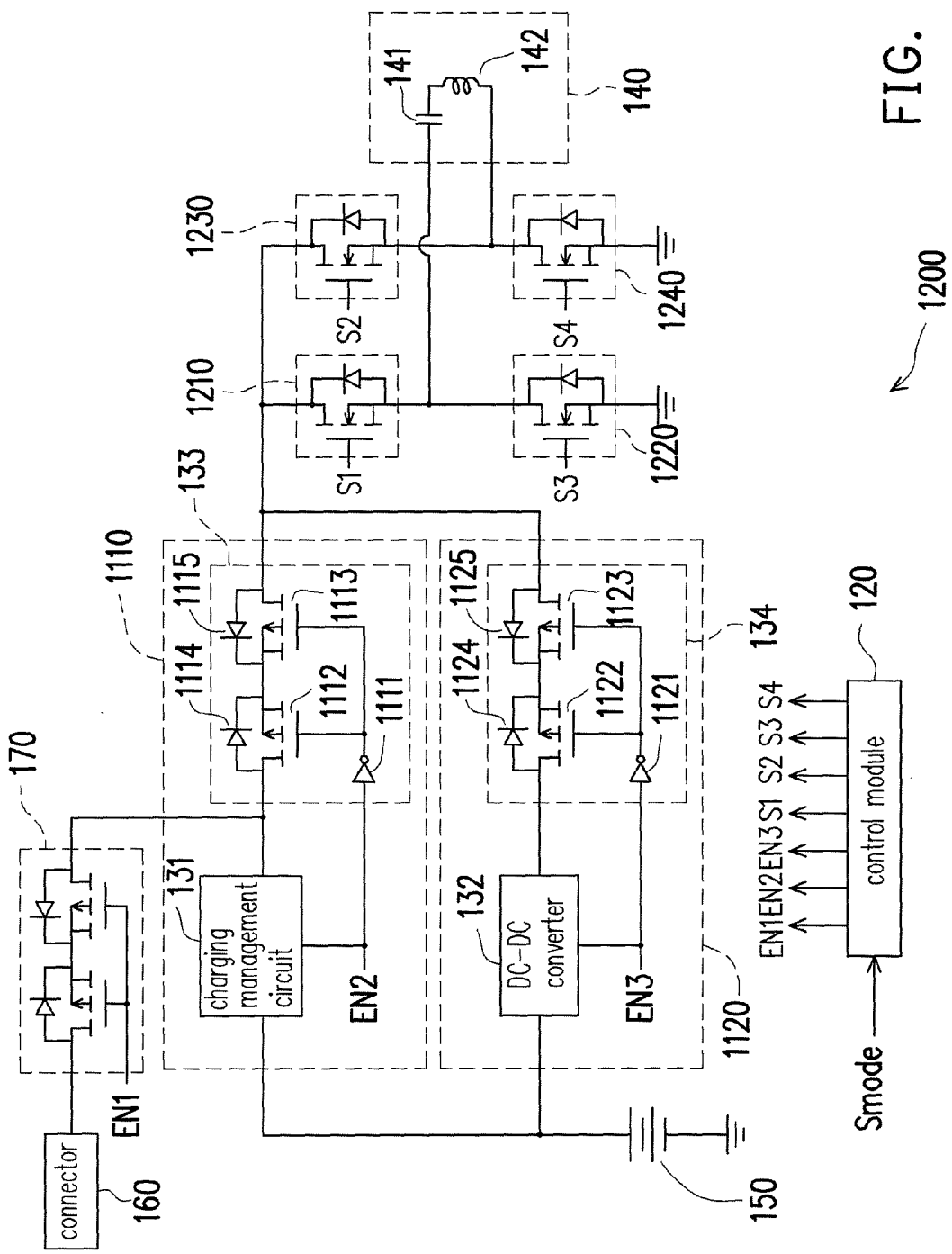
FIG. 12 is a block schematic diagram showing a circuit of a wireless power supply and power receiving device in an embodiment.

FIG. 12 is a block schematic diagram showing a circuit of a wireless power supply and power receiving device 1200 in an embodiment. The wireless power supply and power receiving device 1200 in FIG. 12 includes a battery module 150, a charge management module 1110, a DC-DC convert module 1120, a switch 1210, a switch 1220, a switch 1230, a switch 1240 and a coil module 140. The wireless power supply and power receiving device 1200 in FIG. 12 can be analogized with reference to the description of the wireless power supply and power receiving device 1100 in FIG. 11.

A first end of the switch 1210 is coupled to the input end of the charge management module 1110 and the output end of the DC-DC convert module 1120. A first end of the switch 1220 is coupled to a second end of the switch 1210. A second end of the switch 1220 is coupled to a reference voltage (such as the grounding voltage or another constant voltage). A first end of the switch 1230 is coupled to the input end of the charge management module 1110 and the output end of the DC-DC convert module 1120. A first end of the switch 1240 is coupled to a second end of the switch 1230. A second end of the switch 1240 is coupled to the reference voltage (such as the grounding voltage or another constant voltage). The operation method of the switch 1210, the switch 1220, the switch 1230 and the switch 1240 in FIG. 12 can be analogized with reference to the description of the switches 501 to 504 in FIG. 5. The details of the switch 1210, the switch 1220, the switch 1230 and the switch 1240 in FIG. 12 can be analogized with reference to the description of the switch 501 in FIG. 7.

A first end of the coil module 140 is coupled to the second end of the switch 1210. A second end of the coil module 140 is coupled to the second end of the switch 1230. The coil module 140 in FIG. 12 can be analogized with reference to the description of the coil module 140 in FIG. 5.

The control module 120 in FIG. 12 is coupled to the enable end of the charge management module 1110 to provide a control signal EN2. The control module 120 is coupled to the enable end of the DC-DC convert module 1120 to provide a control signal EN3. The control module 120 is coupled to the control end of the switch 1210 to provide a control signal S1. The control module 120 is coupled to the control end of the switch 1230 to provide a control signal S2. The control module 120 is coupled to the control end of the switch 1220 to provide a control signal S3. The control module 120 is coupled to the control end of the switch 1240 to provide a control signal S4.

In the embodiment shown in FIG. 12, the charge management module 1110 includes a charging management circuit 131 and a switch 133. When the wireless power supply and power receiving device 1200 is operated in the wireless power supply mode, according to the control signal EN2 of the control module 120, the switch 133 is turned off. When the wireless power supply and power receiving device 1200 is operated in the wireless power receiving mode, according to the control signal EN2 of the control module 120, the switch 133 is turned on. In the embodiment shown in FIG. 12, the switch 133 includes a transistor 1112, a transistor 1113, a diode 1114 and a diode 1115. The gate of the transistor 1112 and the gate of the transistor 1113 are used as the control end of the switch 133 to receive the control signal EN2. The drain of the transistor 1112 used as a first end of the switch 133 is coupled to the input end of the charging management circuit 131. The source of the transistor 1112 is coupled to the source of the transistor 1113. The drain of the transistor 1113 used as a second end of the switch 133 is coupled to the first end of the switch 1130. The anode of the diode 1114 is coupled to the drain of the transistor 1112. The cathode of the diode 1114 is coupled to the source of the transistor 1112. The cathode of the diode 1115 is coupled to the source of the transistor 1113. The anode of the diode 1115 is coupled to the drain of the transistor 1113.

In the embodiment shown in FIG. 12, the DC-DC convert module 1120 includes a DC-DC converter 132 and a switch 134. When the wireless power supply and power receiving device 1200 is operated in the wireless power supply mode, according to the control signal EN3 of the control module 120, the switch 134 is turned on. When the wireless power supply and power receiving device 1200 is operated in the wireless power receiving mode, according to the control signal EN3 of the control module 120, the switch 134 is turned off. In the embodiment shown in FIG. 12, the switch 134 includes a transistor 1122, a transistor 1123, a diode 1124 and a diode 1125. The gate of the transistor 1122 and the gate of the transistor 1123 are used as the control end of the switch 134 to receive the control signal EN3. The drain of the transistor 1122 used as a first end of the switch 134 is coupled to the output end of the DC-DC converter 132. The source of the transistor 1122 is coupled to the source of the transistor 1123. The drain of the transistor 1123 used as a second end of the switch 134 is coupled to the first end of the switch 1210. The anode of the diode 1124 is coupled to the drain of the transistor 1122. The cathode of the diode 1124 is coupled to the source of the transistor 1122. The cathode of the diode 1125 is coupled to the source of the transistor 1123. The anode of the diode 1125 is coupled to the drain of the transistor 1123.

In the embodiment shown in FIG. 12, the wireless power supply and power receiving device 1200 further includes a connector 160 and a switch 170. The connector 160 and the switch 170 in FIG. 12 can be analogized with reference to the description of the connector 160 and the switch 170 in FIG. 5. The switch 170 is under the control of the control signal EN1 of the control module 120. The implementation details of the switch 170 in FIG. 12 can be analogized with reference to the description of the switch 133 and the switch 134 in FIG. 12.

The control module 120 in FIG. 12 can select an operation mode according to the mode signal S mode. For example, the control module 120 can selectively operate in the wireless power supply mode, the wireless power receiving mode or the coil disable mode according to the mode signal S mode. In the coil disable mode, under the control of the control module 120, the charge management module 1110 and the DC-DC convert module 1120 are disabled, the switch 170 is turned on, and the switches 1210, 1220, 1230 and 1240 are turned off. Thus, when the wireless power receiving function (receiver) and wireless power supply function (transmitter) of the wireless power supply and power receiving device 1200 are turned off/disabled, the charging management circuit 131 can receive the power from the external power supply (not shown) via the connector 160 to charge the battery module 150.

Please refer to FIG. 6 and FIG. 12, when the wireless power supply and power receiving device 1200 is operated in the wireless power supply mode, under the control of the control module 120, in the period T1, the switch 1210 and the switch 1240 are turned on, the switch 1220 and the switch 1230 are turned off, in the period T2, the switch 1210 and the switch 1240 are turned off, and the switch 1220 and the switch 1230 are turned on. In the period T1 and T2, the charge management module 1110 is disabled and the DC-DC convert module 1120 is enabled. Thus, in the wireless power supply mode, the switches 1210, 1220, 1230 and 1240 can convert direct current provided by the DC-DC convert module 1120 to alternating current, and the alternating current is supplied to the coil module 140.

Please refer to FIG. 12, when the wireless power supply and power receiving device 1200 is operated in the wireless power receiving mode, under the control of the control module 120, the charge management module 1110 is enabled, the DC-DC convert module 1120 is disabled. The control module 120 can receive and compare the voltage of a first end of the coil module 140 and the voltage of a second end of the coil module 140. When the voltage of the first end of the coil module 140 is higher than the voltage of the second end of the coil module 140, the switch 1210 and the switch 1240 are turned on, and the switch 1220 and the switch 1230 are turned off. When the voltage of the first end of the coil module 140 is not higher than the voltage of the second end of the coil module 140, the switch 1210 and the switch 1240 are turned off, and the switch 1220 and the switch 1230 are turned on.

Consequently, the switches 1210, 1220, 1230 and 1240 can rectify the alternating current of the coil module 140 to direct current in the wireless power receiving mode, and the rectified direct current is supplied to the battery module 150 via the charge management module 1110.

In sum, in the embodiments, in the wireless power supply mode, the switches 1210, 1220, 1230 and 1240 (or switches 1113 and 1140) can convert direct current to alternating current and convert the alternating current to wireless power energy by using the coil module 140. In the wireless power receiving mode, the switches 1210, 1220, 1230 and 1240 (or the switches 1113 and 1140) can rectify the alternating current of the coil module 140 to direct current.

Although the present disclosure has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A wireless power supply and power receiving device, comprising:
   a sensor;
   a control module coupled to the sensor, for generating a determining result according to a position or a direction of the wireless power supply and power receiving device determined by the sensor;
   a coil module;
   a battery module; and
   a rectifying and switching module coupled to the control module for selectively operating at a wireless power supply mode or a wireless power receiving mode according to the determining result, including:
   a charging management circuit including an output end coupled to the battery module;
   a DC-DC converter including an output end coupled to the battery module;
   a first switch including a first end coupled to an input end of the charging management circuit, the first switch is turned off in the wireless power supply mode, and the first switch is turned on in the wireless power receiving mode;
   a second switch including a first end coupled to the output end of the DC-DC converter, the second switch is turned on in the wireless power supply mode, and the second switch is turned off in the wireless power receiving mode; and
   a rectifying and switching circuit including a first end coupled to a second end of the first switch and a second end of the second switch, and a second end coupled to the coil module.

2. The wireless power supply and power receiving device according to claim 1,
   wherein when the rectifying and switching module operates in the wireless power supply mode, the rectifying and switching module converts power energy to first wireless power energy to charge a first external device via the coil module; when the rectifying and switching module operates in the wireless power receiving mode, the rectifying and switching module receives second wireless power energy from a second external device via the coil module.

3. The wireless power supply and power receiving device according to claim 2, wherein the rectifying and switching circuit comprises:
   a third switch including a first end coupled to the second end of the first switch and the second end of the second switch, and a second end coupled to a first end of the coil module;
   a fourth switch including a first end coupled to the second end of the first switch and the second end of the second switch, and a second end coupled to a second end of the coil module;
   a fifth switch including a first end coupled to the second end of the third switch, and a second end coupled to a reference voltage; and
   a sixth switch including a first end coupled to the second end of the forth switch, and a second end coupled to the reference voltage;
   wherein in the wireless power supply mode, the third switch and the sixth switch are turned on, and the forth switch and the fifth switch are turned off in a first period; the third switch and the sixth switch are turned off, and the forth switch and the fifth switch are turned on in a second period; and
   in the wireless power receiving mode, when the voltage of the first end of the coil module is higher than the voltage of the second end of the coil module, the third switch and the sixth switch are turned on and the forth switch and the fifth switch are turned off; when the voltage of the first end of the coil module is lower than the voltage of the second end of the coil module, the third switch and the sixth switch are turned off and the forth switch and the fifth switch are turned on.

4. The wireless power supply and power receiving device according to claim 2, wherein the rectifying and switching circuit comprises:
   a third switch including a first end coupled to the second end of the first switch and the second end of the second switch, and a second end coupled to a first end of the coil module; and
   a fourth switch including a first end coupled to the second end of the third switch, a second end coupled to a reference voltage,
   wherein in the wireless power supply mode, the third switch is turned on and the forth switch is turned off in a first period; the third switch is turned off and the forth switch is turned on in a second period; and
   in the wireless power receiving mode, when the voltage of the first end of the coil module is higher than the reference voltage, the third switch is turned on and the forth switch is turned off; when the voltage of the first end of the coil module is not higher than the reference voltage, the third switch and the forth switch are turned off.

5. The wireless power supply and power receiving device according to claim 2, wherein in the wireless power supply mode, the charging management circuit is disabled and the DC-DC converter is enabled; and in the wireless power receiving mode, the charging management circuit is enabled and the DC-DC converter is disabled.

6. The wireless power supply and power receiving device according to claim 1, wherein the rectifying and switching module comprises:
   a switch circuit including an input end coupled to the battery module, and an output end coupled to the coil module, wherein in the wireless power supply mode, the switch circuit converts the power energy provided by the battery module to the first wireless power energy via the coil module; and
   a rectifying circuit including an output end coupled to the battery module, an input end coupled to the coil module, wherein in the wireless power receiving mode, the rectifying circuit converts the second wireless power energy received by the coil module to the charging power to provide to the battery module.

7. The wireless power supply and power receiving device according to claim 6, wherein the switch circuit comprises:
   a first switch including a first end coupled to the battery module, and a second end coupled to a first end of the coil module;
   a second switch including a first end coupled to the battery module, and a second end coupled to a second end of the coil module;
   a third switch including a first end coupled to the second end of the first switch, and a second end coupled to a reference voltage; and
   a fourth switch including a first end coupled to the second end of the second switch, and a second end coupled to the reference voltage;

wherein in the wireless power supply mode, the first switch and the forth switch are turned on and the second switch and the third switch are turned off, in a first period; the first switch and the forth switch are turned off, and the second switch and the third switch are turned on, in a second period; and in the wireless power receiving mode, the first switch, the second switch, the third switch and the forth switch are turned off.

8. The wireless power supply and power receiving device according to claim 6, wherein the rectifying circuit comprises:

a first switch including a first end coupled to the battery module and a second end coupled to a first end of the coil module;

a second switch including a first end coupled to the battery module and a second end coupled to a second end of the coil module;

a third switch including a first end coupled to the second end of the first switch and a second end coupled to a reference voltage; and a fourth switch including a first end coupled to the second end of the second switch and a second end coupled to the reference voltage;

wherein in the wireless power supply mode, the first switch, the second switch, the third switch and the forth switch are turned off; and in the wireless power receiving mode, when the voltage of the first end of the coil module is higher than the voltage of the second end of the coil module, the first switch and the forth switch are turned on, and the second switch and the third switch are turned off; when the voltage of the first end of the coil module is lower than the voltage of the second end of the coil module, the first switch and the forth switch are turned off and the second switch and the third switch are turned on.

* * * * *